(12) United States Patent
Kalantari et al.

(10) Patent No.: US 9,061,558 B2
(45) Date of Patent: Jun. 23, 2015

(54) HYBRID AERIAL AND TERRESTRIAL VEHICLE

(71) Applicants: Arash Kalantari, Chicago, IL (US); Matthew Spenko, Chicago, IL (US)

(72) Inventors: Arash Kalantari, Chicago, IL (US); Matthew Spenko, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 10 days.

(21) Appl. No.: 14/043,490

(22) Filed: Oct. 1, 2013

(65) Prior Publication Data

US 2014/0131507 A1    May 15, 2014

Related U.S. Application Data

(60) Provisional application No. 61/726,335, filed on Nov. 14, 2012.

(51) Int. Cl.
| | |
|---|---|
| *B60F 5/02* | (2006.01) |
| *B64C 25/36* | (2006.01) |
| *A63H 27/133* | (2006.01) |
| *B64C 39/02* | (2006.01) |
| *A63H 33/00* | (2006.01) |
| *A63H 27/00* | (2006.01) |

(52) U.S. Cl.
CPC . *B60F 5/02* (2013.01); *B64C 25/36* (2013.01); *B64C 39/028* (2013.01); *B64C 2201/127* (2013.01); *A63H 33/005* (2013.01); *A63H 27/12* (2013.01); *B64C 39/024* (2013.01); *B64C 2201/027* (2013.01); *B64C 2201/042* (2013.01)

(58) Field of Classification Search
CPC ...... B64C 25/001; B64C 25/36; B64C 25/66; B64C 37/00; B64C 39/028; B64C 2201/021; B64C 2201/028; B64C 2201/086; B64C 2201/088; B64D 45/06; B60F 5/02; A63H 27/12; A63H 33/005
See application file for complete search history.

(56) References Cited

U.S. PATENT DOCUMENTS

| | | | | |
|---|---|---|---|---|
| 1,777,941 | A * | 10/1930 | Szakacs | 244/50 |
| 4,046,339 | A * | 9/1977 | Stancliffe | 244/103 R |
| 4,676,459 | A * | 6/1987 | Seefluth | 244/65 |
| 6,860,346 | B2 * | 3/2005 | Burt et al. | 180/8.2 |
| 7,794,300 | B2 * | 9/2010 | Moll et al. | 446/164 |
| 7,959,104 | B2 * | 6/2011 | Kuntz | 244/2 |
| 8,167,234 | B1 * | 5/2012 | Moore | 244/17.25 |
| 8,197,298 | B2 * | 6/2012 | Willett | 446/164 |
| 8,342,440 | B2 * | 1/2013 | Papanikolopoulos et al. | 244/2 |
| 8,528,854 | B2 | 9/2013 | Yan et al. | |

(Continued)

FOREIGN PATENT DOCUMENTS

| | | |
|---|---|---|
| CN | 101940845 A | 1/2011 |
| WO | WO 2012130856 A1 * | 10/2012 |
| WO | WO 2013182708 A1 * | 12/2013 |

OTHER PUBLICATIONS

D. Mellinger et al., "Control of Quadrotors for Robust Perching and Landing", Proceedings of the International Powered Lift Conference, Oct. 5-7, 2010, American Helicopter Society International, Inc.

*Primary Examiner* — Joseph W Sanderson
(74) *Attorney, Agent, or Firm* — Pauley Petersen & Erickson

(57) ABSTRACT

A vehicle capable of both aerial and terrestrial locomotion. The terrestrial and aerial vehicle includes a flying device and a rolling cage connected to the flying device by at least one revolute joint. The rolling cage at least partially surrounds the flying device and is free-rolling and not separately powered.

20 Claims, 11 Drawing Sheets

(56) References Cited

U.S. PATENT DOCUMENTS

| | | | |
|---|---|---|---|
| 8,794,564 B2* | 8/2014 | Hutson | 244/17.17 |
| 8,794,566 B2* | 8/2014 | Hutson | 244/17.23 |
| 2008/0048065 A1* | 2/2008 | Kuntz | 244/17.23 |
| 2010/0224723 A1* | 9/2010 | Apkarian | 244/65 |
| 2011/0139923 A1* | 6/2011 | Papanikolopoulos et al. | 244/2 |
| 2012/0018579 A1* | 1/2012 | Yan et al. | 244/119 |
| 2014/0061362 A1* | 3/2014 | Olm et al. | 244/2 |
| 2014/0131507 A1* | 5/2014 | Kalantari et al. | 244/2 |
| 2014/0319266 A1* | 10/2014 | Moschetta et al. | 244/13 |

* cited by examiner

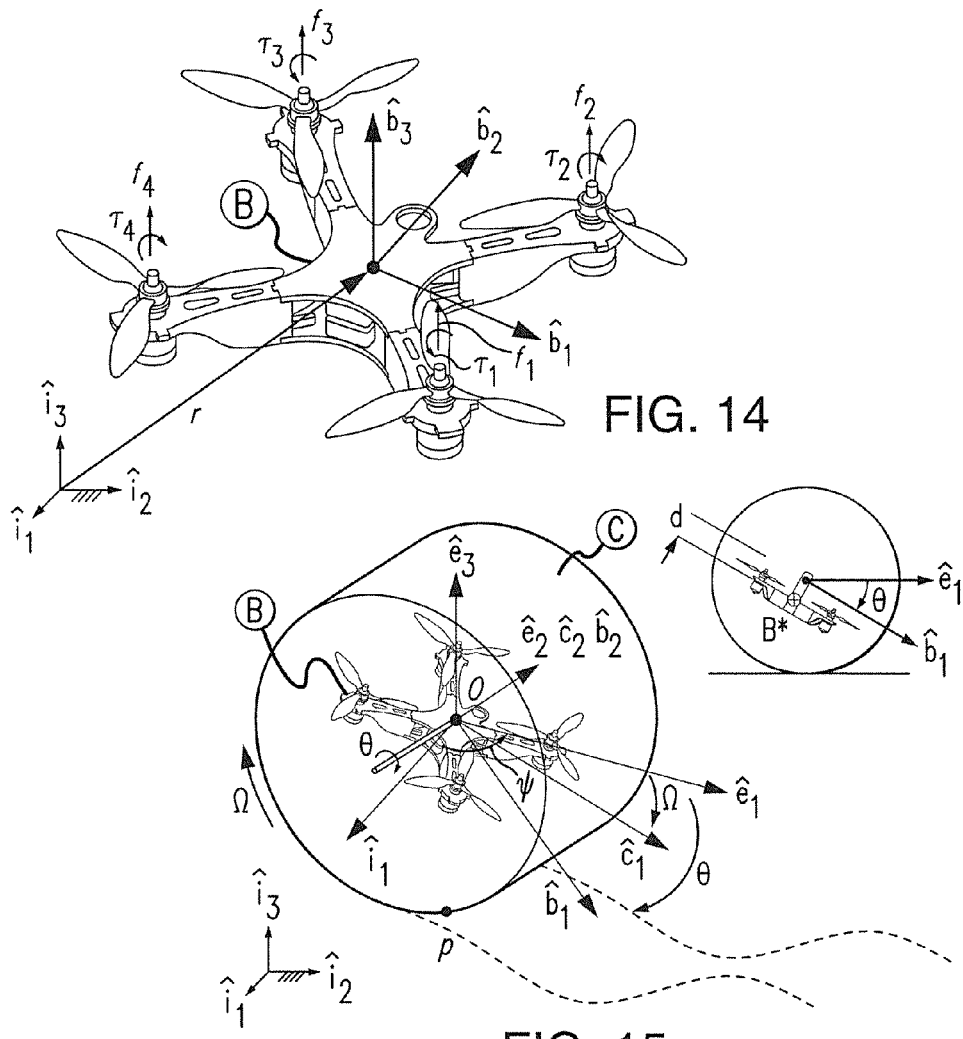
FIG. 14
FIG. 15
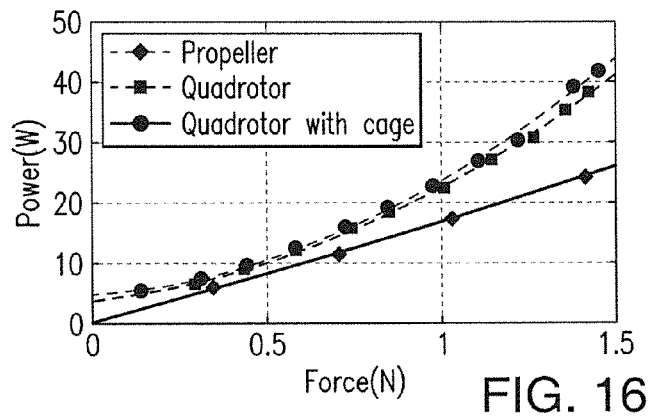
FIG. 16

HYBRID AERIAL AND TERRESTRIAL VEHICLE

CROSS REFERENCE TO RELATED APPLICATION

This application claims the benefit of U.S. Provisional Application, Ser. No. 61/726,335, filed on 14 Nov. 2012. The provisional application is hereby incorporated by reference herein in its entirety and is made a part hereof, including but not limited to those portions which specifically appear hereinafter.

This invention was made with government support under award N00014-10-1-0769 awarded by Office of Naval Research. The government has certain rights in the invention.

BACKGROUND OF THE INVENTION

1. Field of the Invention

This invention is directed to an unmanned vehicle, and more particularly to an autonomous or remotely controlled vehicle capable of both aerial and terrestrial locomotion.

2. Discussion of Related Art

The ability to quickly reach a goal location without needing to navigate obstacles or challenging terrain makes aerial vehicles an excellent choice in applications like search and rescue or military surveillance. Consequently, Unmanned Aerial Vehicles (UAVs), and especially the smaller class of Micro Air Vehicles (MAVs), are gathering increased interest among researchers. However, it is difficult for MAVs to remain airborne for an extended period of time because of their high energy consumption.

SUMMARY OF THE INVENTION

This invention includes a vehicle capable of both aerial and terrestrial locomotion. In one embodiment, the terrestrial and aerial vehicle includes a flying device and a rolling cage connected to the flying device by at least one revolute joint. The flying device desirably includes at least one rotor, i.e., a rotorcraft, and the rolling cage at least partially encloses or surrounds the flying device. In particular embodiments of this invention, the flying device and/or rolling cage includes a shaft connected to the other of the rolling cage and/or flying device. A bearing connects the shaft to the flying device and/or the rolling cage, such as to form a revolute joint.

Flight is desirably achieved using a rotorcraft flying device, which can have different configurations based on the number of rotors used. Single rotor, coaxial rotors, tandem rotors, tricopter, quadcopter, hexacopter, and octocopter are all different types of rotorcrafts that can serve as the flying agent of the hybrid system. Connecting this rotorcraft with a rolling cage through one or more revolute joints makes terrestrial locomotion possible. As used herein, "terrestrial" includes both solid surfaces and liquid surfaces, such as bodies of water. This design allows the cage to roll freely with respect to the flying system. The rolling cage is desirably not powered directly, and freely rolls due to the rotor thrust of the flying device alone.

During flight, the rotor actuator(s) provide enough lift to overcome the weight of the vehicle, and the system functions as a regular flying system; it can move by rolling or pitching and change direction by changing its yaw angle. For terrestrial locomotion, the rotorcraft must first pitch about the revolute joint center (see FIG. 12). In this configuration, the thrust of the rotor(s) results in cage rolling on the ground, and the vehicle moves forward. Changing the direction is also possible by changing the vehicle's yaw angle. In terrestrial mode the system only needs to overcome the ground friction which is much lower compared to the vehicle's weight. Therefore, rolling on the ground is much more efficient than flying, and the vehicle's operation time and range is increased compared to the aerial-only system.

Combining the terrestrial and aerial locomotion modes in a hybrid design incorporates the advantages of both modes in a single system. Adding a reliable terrestrial locomotion structure to an aerial vehicle provides improved efficiency, which extends operation time and range. On the other hand, adding flight capabilities to a terrestrial system eliminates the problem of obstacle negotiation. When an obstacle is encountered, the system easily flies over it.

Existing hybrid systems are usually composed of separate aerial and terrestrial locomotion actuator mechanisms directly attached together to form the hybrid vehicles. In contrast, a feature of embodiments of this invention is that the vehicle uses the same primary actuators for both modes of locomotion, e.g., the flight system also power the terrestrial locomotion. Consequently, neither the mass nor the system complexity is increased by inclusion of actuators for aerial locomotion and separate actuators for terrestrial locomotion, or by the inclusion of a transmission coupled with a clutch between two locomotion systems.

Using the same actuators for both forms of locomotion greatly simplifies the system's mechanical and control complexity. Combining the terrestrial and aerial locomotion modes in a hybrid design incorporates the advantages of both modes in a single vehicle. Adding a reliable terrestrial locomotion mode to a MAV provides improved efficiency, which extends operation time and range. On the other hand, adding flight capabilities to a terrestrial vehicle eliminates the problem of obstacle negotiation. When an obstacle is encountered, the system easily flies over it.

Similar to other mobile vehicle platforms, the system can be applied in hazardous environments for a human operator such as search and rescue and military missions. Other potential application of this system lies in entertainment industry, as a toy.

The invention has a simple design. This makes it easy and low cost to manufacture. The flying system does not have a new or specific design requirement. Any regular flying rotorcraft system, for which there are many well developed samples available, can be employed as the flying agent. The rolling cage is desirably impact resistance and durable against the shocks that aggressive landings or crashes of the flying device can cause. In one embodiment, polycarbonate and carbon fiber materials were used to fabricate the prototype system. As detailed below, the fabricated cage was/is able to successfully resist shocks and forces.

To reduce dissipation of energy during terrestrial locomotion, the joint connecting the rolling cage and the flying system should have the minimum possible friction. Mounting bearings at the position of the joints helps reduce the friction.

BRIEF DESCRIPTION OF THE DRAWINGS

These and other objects and features of this invention will be better understood from the following detailed description taken in conjunction with the drawings.

FIG. 14 illustrates the reference frames used for the derivation of the equations of motion when the vehicle is in flight. I is the inertial frame, with $\hat{i}_3$ pointing in the direction opposite of the gravity vector. B is a body-fixed coordinate frame with $\hat{b}_3$ pointing normal to the quadrotor's plane of propellers.

FIG. 15 illustrates the coordinate frames for the terrestrial mode. I is the inertial frame with $\hat{i}_3$ pointing in the direction opposite of the gravity vector. E is fixed at the center of the cage with $\hat{e}_3$ always parallel to $\hat{i}_3$ and pointing upward. C is the frame fixed to the cage with $\hat{c}_2$ always pointing along $\hat{e}_2$. B is the body coordinate frame fixed to the quadrotor with $\hat{c}_3$ normal to quadrotor and pointing upward.

FIG. 16 The power-thrust relationship for the prototype's propeller (GWS 3 bladed propellers, 127 mm in diameter and 76 mm pitch).

DESCRIPTION OF EMBODIMENTS OF THE INVENTION

This invention provides a mobile autonomous or remote-controlled vehicle, such as a MAV, capable of both aerial and terrestrial locomotion. Flight is desirably achieved through a suitable rotor configuration, such as a quadrotor with four actuators that provide the required thrust. Adding a non-powered rolling cage to the vehicle makes terrestrial locomotion possible using the same actuator set and control system. Thus, neither the mass nor the system complexity is increased by inclusion of separate actuators for terrestrial and aerial locomotion. An analysis of the system's energy consumption demonstrated that during terrestrial locomotion, the vehicle only needs to overcome rolling resistance and consumes much less energy compared to the aerial mode. This solves one of the most vexing problems of quadrotors and rotorcraft in general, namely their short operation time. Experimental results showed that the hybrid vehicle can travel a distance four times greater and operate almost six times longer than an aerial-only system. It also solves one of the most challenging problems in terrestrial vehicle design, namely obstacle avoidance. When an obstacle is encountered, the system simply flies over it.

Figure 1:
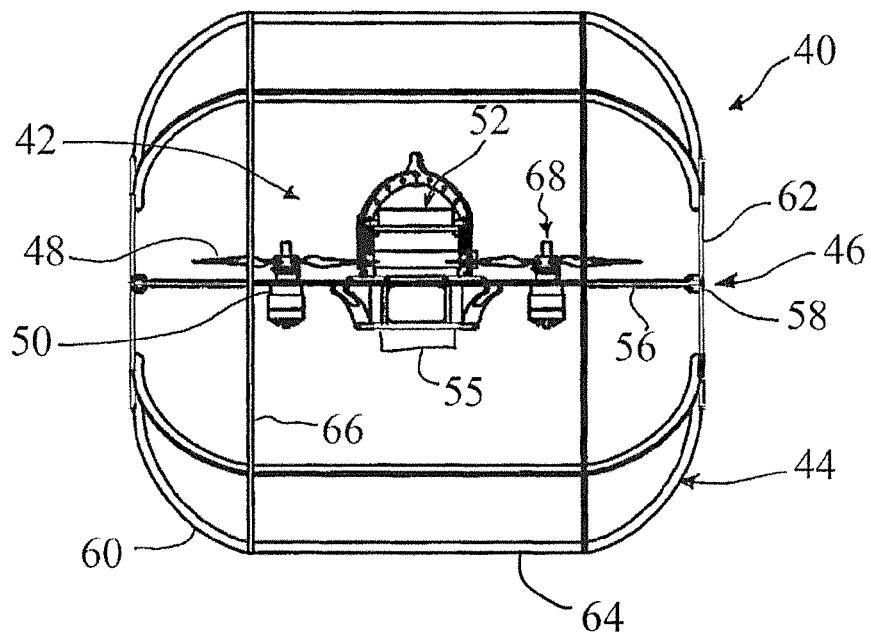
FIGS. 1-3 show a vehicle according to one embodiment of this invention.
Figure 2:
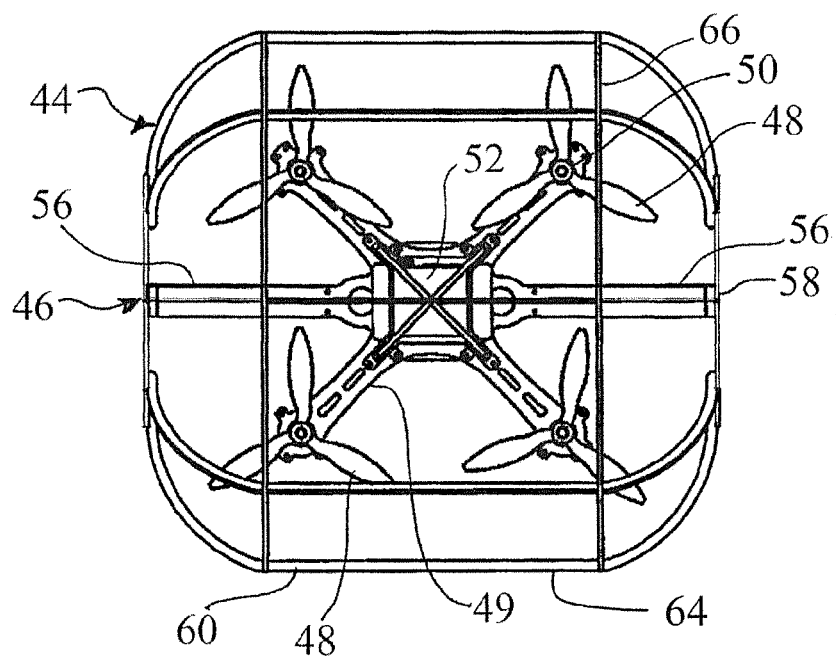
Figure 3:
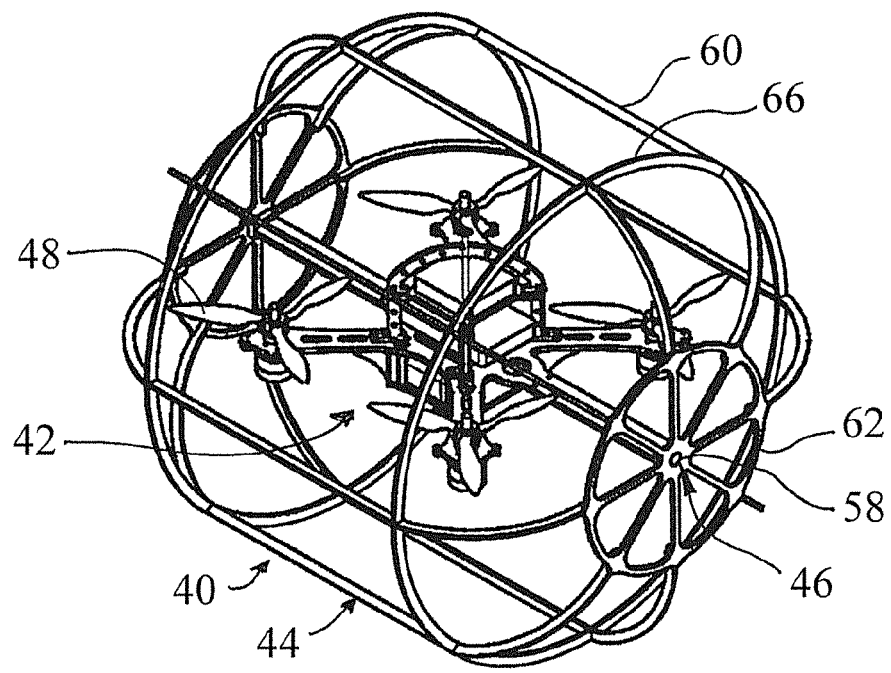

In one embodiment of this invention, referring to FIGS. 1-3, the vehicle 40 has a flying system or device 42 in combination with a rolling cage 44. The flying device 42 is preferably connected to the cage by a revolute joint 46. The flying device shown in FIG. 1 includes four rotors 48 each propelled by a rotor actuator 50 held on a rotor arm 49. The flying device of this invention can be any suitable flying device having any number and configuration of rotors 48 and actuators. The rotors can be any suitable size, shape and configuration. Similarly the actuators can be any suitable size or configuration. Each rotor desirably is powered by a corresponding electric actuator, but a single actuator can be used to power one or more rotors. One or more battery systems 52 can be used to power the one or more actuators.

The vehicle of this invention can be used for any suitable purpose, such as for entertainment, military, or security uses. In particular embodiments, any suitable security recording equipment or weaponry can be added to the vehicle. As shown in FIG. 1, an optional surveillance camera 55 is representatively shown mounted on the flying device 42.

In embodiments of this invention, the rolling cage extends around at least a portion of the flying device, and desirably surrounds or encloses at least a portion of the flying device. In the embodiment of FIG. 1, the flying device 42 is surrounded by and enclosed in the rolling cage 44. The rolling cage 44 is connected to the flying device on either side by a shaft 56. The revolute joint 46 can include any suitable bearing 58, such as, without limitation, a planar bearing. These bearings help reduce the joint friction and therefore energy consumption. Any suitable size, shape, type, number, and configuration is available for each of the shaft and bearing. For example, the shaft can be fixed to the rolling cage at one end and connected to the flying device 42 via a bearing or vice versa. Also, the shaft can be a one-piece shaft extending through the flying device 42 and connected at either end to the rolling cage 44.

The rolling cage 44 of FIGS. 1-3 is formed of a plurality of rails 60 connected to or integrally formed between two opposing ends hubs 62. The cage 44 include horizontal rails 64 that extend parallel to the shaft(s) 56 and perpendicular to a rotor rotation axis 68. Cross rails 66 provide further strength and support for the rails 64. Any suitable size, shape and configuration is available for the rolling cage and rails of the rolling cage, depending on need. The cage and rails can be formed of any suitable material, such as metal and plastic, and desirably of rigid and lightweight materials such as polycarbonate and carbon fiber materials. The rolling cage can also be formed of hollow or foam filled rails or tubes or other suitable structures to promote floatation when moving on water surfaces.

Figure 4:
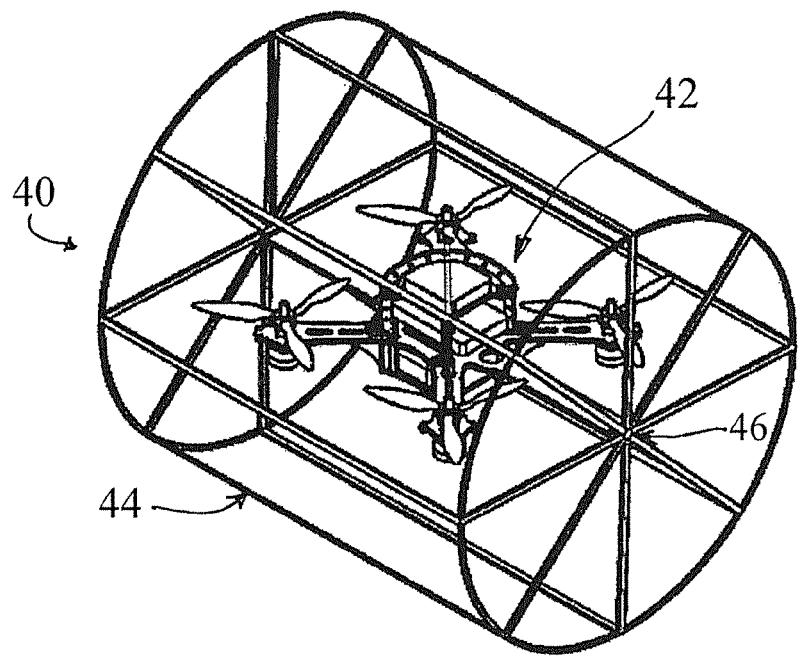
FIGS. 4-11 illustrate flying devices according to other embodiments of this invention.
Figure 5:
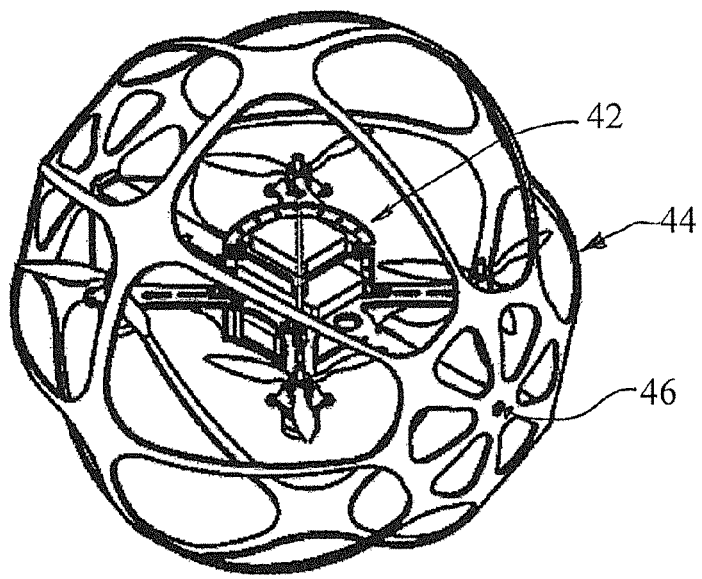
Figure 6:
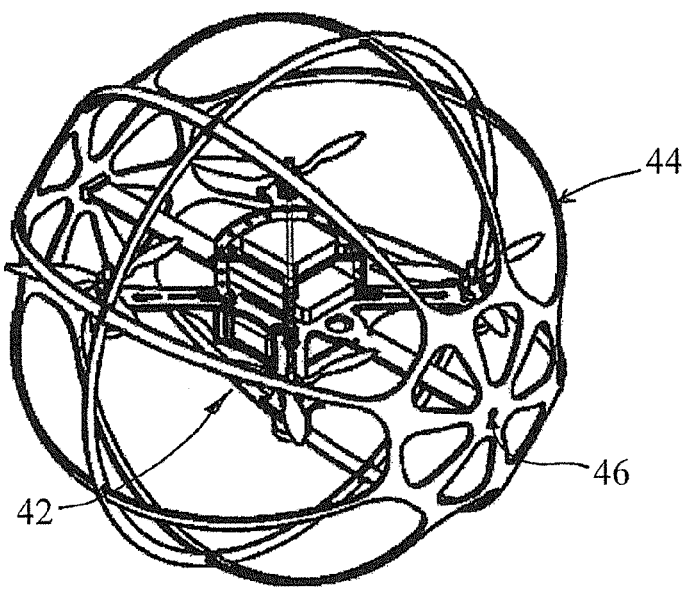
Figure 7:
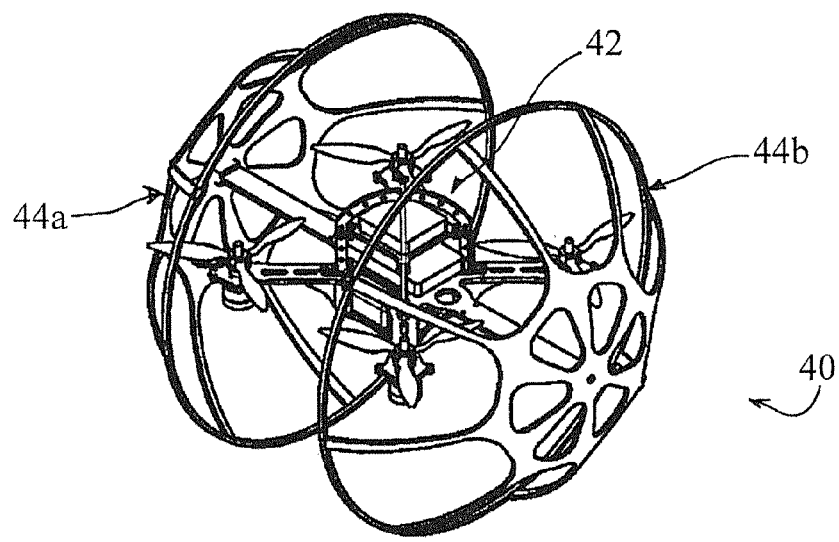
Figure 8:
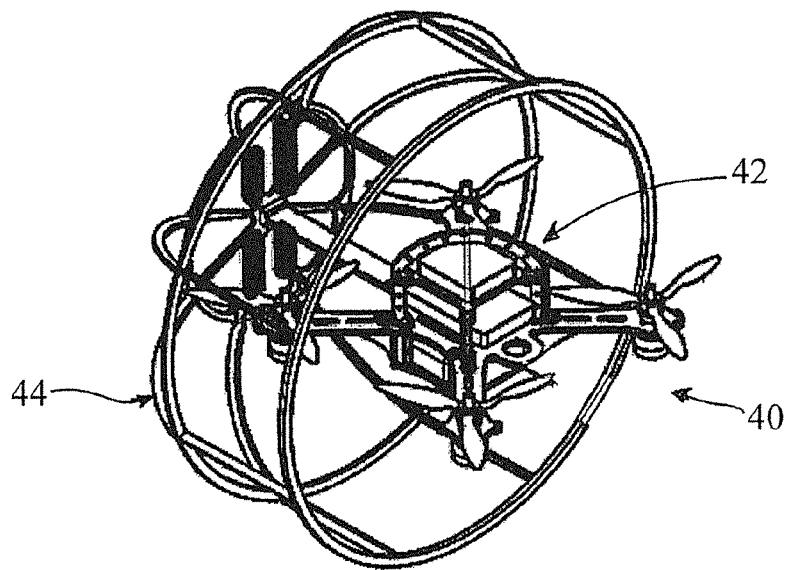
Figure 9:
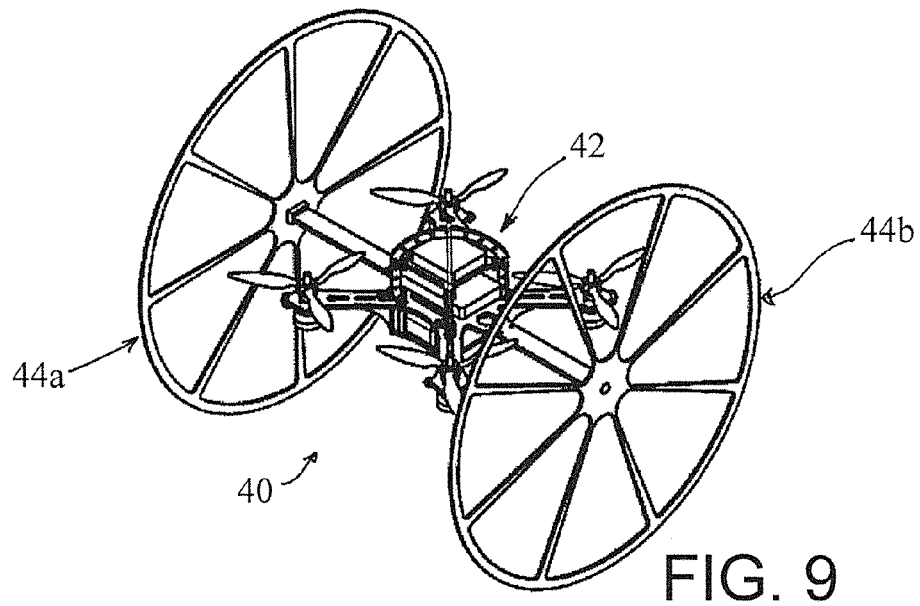
Figures 10, 11:
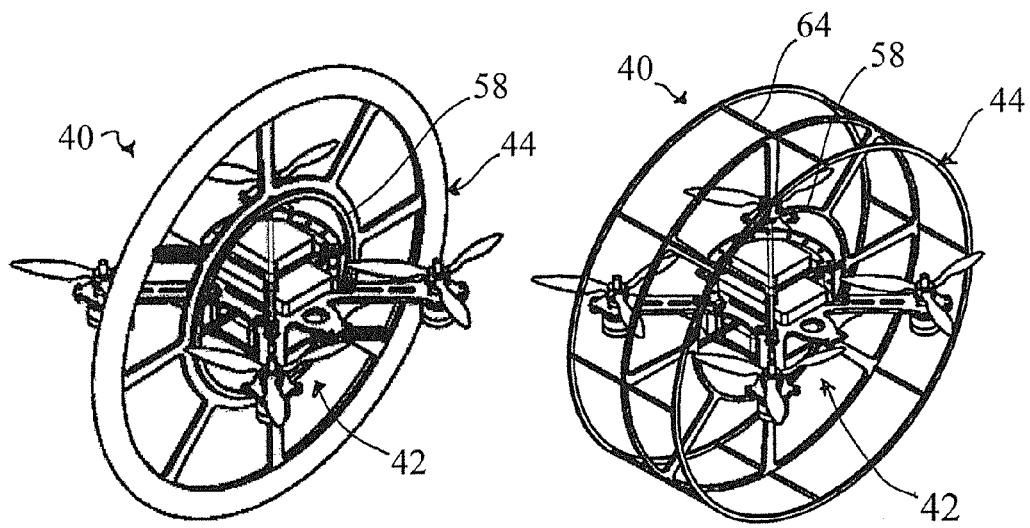

The rolling cage can have any suitable shape and configuration to allow the cage to roll under thrust power of the flying device, such as, for example, the rolling cage comprises a hemisphere, a ring, a sphere, a partial sphere, an oblate sphere, a partial oblate sphere, a cylinder, a toroid, a parallelepiped, a polyhedron, or a prism. FIGS. 4-11 illustrate alternative embodiments, without limitation, of the rolling cage according to this invention. FIG. 4 illustrates a cylindrical rolling cage 44 having planar spoked ends 62. FIGS. 5 and 6 illustrate alternative spherical rolling cages 44. FIG. 7 illustrates a rolling cage 44 formed of two spaced apart hemispherical portions 44a and 44b. The flying device 42 is disposed between, and at least partially enclosed by, the two cage portions 44a and 44b. As illustrated in FIG. 8, the vehicle can also operate with only one hemispherical rolling cage 44, particularly as the vehicle is propelled using the rotors, which can keep the vehicle upright. FIG. 9 illustrates a rolling cage 44 without horizontal rails, and with the flying device 42 between, and at least partially enclosed or surrounded by, two rolling cage portions 44a and 44b. FIG. 10 illustrates a ring-shaped rolling cage 44 surrounding a central portion of the flying device 42. A larger bearing 58 has been adapted to encircle the center of the flying device 42. The ring rolling cage 44 of FIG. 10 can also be widened as shown if FIG. 11, for example, such as by use of more than one ring and horizontal rails 64, to provide further terrestrial support.

Figure 12:
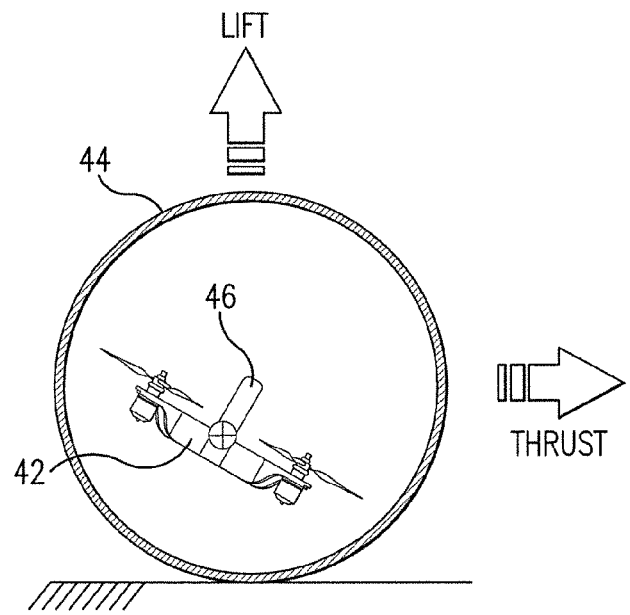
FIG. 12 representatively illustrates a vehicle operation according to one embodiment of this invention.

In preferred embodiments of this invention, the rolling cage 44 is not directly powered, and instead rolls against a surface based upon movement by the flying device 42 across the surface. As representatively shown in FIG. 12, the flying device 42 rotors and actuators provide both the lift for aerial locomotion and thrust for terrestrial locomotion. Using a single set of rotor actuators to power both aerial and terrestrial modes of locomotion increases efficiency and battery life. Consequently, neither the mass nor the system complexity is increased by inclusion of actuators for aerial locomotion and separate actuators for terrestrial locomotion.

Using a single set of rotor actuators for both forms of locomotion greatly also simplifies the system's mechanical and control complexity. Combining the terrestrial and aerial locomotion modes in a hybrid design incorporates the advantages of both modes in a single vehicle. Adding a reliable terrestrial locomotion structure to a flying device provides improved efficiency where terrestrial locomotion is possible, which extends operation time and range. When a terrestrial obstacle is encountered, the vehicle easily flies over it.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

Figure 13:
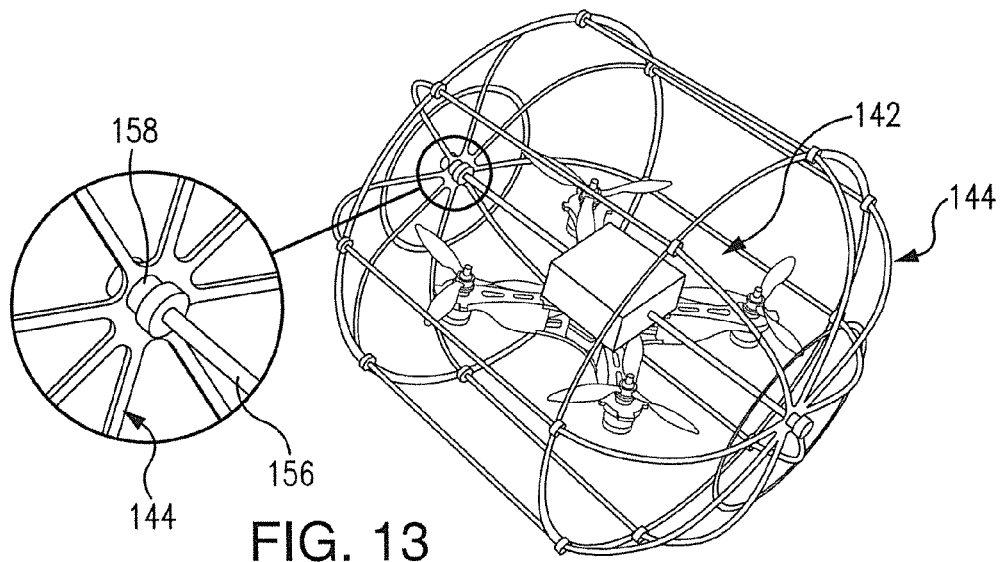
FIG. 13 illustrates a prototype of the invention with a quadcopter as the flying system and a cylindrical cage, according to one embodiment of this invention.

A prototype of the invention was created and tested. The prototype is shown in FIG. 13, and included a quadcopter 142 with four actuated rotors 148 enclosed by a non-powered or non-actuated rolling cage 144. The rolling cage was connected to the quadcopter 142 by a shaft 156 and revolute joint created by the shaft 156 and planar bearing 158. The terrestrial locomotion of the prototype functioned successfully in both indoor and outdoor environments and on different terrain types, including pavement, grass, and sand. The vehicle was tested to verify its operation time and range compared to an aerial-only system. The results show that on linoleum the prototype of the hybrid vehicle had an operation time of 50 minutes and could travel 9 km within this timeframe when rolling on a linoleum surface. This means the hybrid system has at least 10 times greater operation time and 2.5 times greater operation range compared to an aerial-only system.

I. Dynamics Model

The prototype system's equations of motion were developed for both the aerial and terrestrial modes of operation. The equations were used to choose system parameters for optimal efficiency.

A. Aerial Mode

The prototype behaved as a regular quadrotor during flight. The addition of cage only changed the mass and moments of inertia. The dynamics of such system have been derived many times in detail elsewhere in the literature (D. Mellinger, M. Shomin, and V. Kumar, "Control of quadrotors for robust perching and landing," Proceedings of International Powered Lift Conference 2010, 2010). Thus, they are only summarized here.

TABLE I

FLIGHT SYSTEM SPECIFICATIONS

| Element | Properties |
|---|---|
| Actuator | 11.1 V BLDC, kV(RPM/V): 1700 Power: 75 W |
| Propellers | 5" × 3", 3 blades |
| Battery | Lithium-Polymer 3S, 1350 mAh |

FIG. 14 shows the reference frames used in derivation of the equations of motion, which are given below.

$$m_B {}^I \ddot{r}^{B*} = -m_B g + u_f \hat{b}_3 + u_d \frac{{}^I \dot{r}^{B*}}{\|\dot{r}\|} \tag{1}$$

$$I_{B*}^B {}^I \dot{\omega}^B = \begin{bmatrix} u_\phi \\ u_\theta \\ u_\psi \end{bmatrix} - {}^I \omega^B \times I_{B*}^B {}^I \omega^B \tag{2}$$

where $m_B$ is the mass of the vehicle; $I_{B*}^B$ is the moment of inertia of the quadrotor about its center of mass, B*, along the $\hat{b}_1, \hat{b}_2,$ and $\hat{b}_3$ axis; ${}^I r^{B*}$ is the position vector from a fixed point in the inertial frame to B*; g is the gravity vector; and ${}^I \omega^B$ is the rotational velocity of frame B in inertial frame. The magnitude of the drag force, $u_d$, applied to the robot in the direction of flight is defined as:

$$u_d = \frac{1}{2} \rho C_d A_f v^2 \tag{3}$$

where $\rho$ is the air density; $C_d$ is the coefficient of drag; v is the velocity of the robot; and $A_f$ is the frontal area of the robot. Estimations for $C_d$ and $A_f$ of a quadrotor were not found in the literature. The drag coefficient was assumed to be equal to that of a cube ($C_d$=1) and the frontal area is obtained through the following equation.

$$A_f = \alpha_f \cos(\theta) + \alpha_t \sin(\theta) \tag{4}$$

where $\alpha_f$ and $\alpha_t$ are respectively the area of the front and top cross sections of the quadrotor.

B. Terrestrial Mode

The reference frames used in derivation of the equations of motion for terrestrial locomotion are depicted in FIG. 15. During terrestrial locomotion, the propellers' forces roll the cage on the ground by overcoming the opposing forces due to rolling resistance, turning resistance, and air drag.

1) Rolling Resistance:

The rolling resistance torque opposes the rolling motion of the cylindrical cage on the ground. This torque, $\tau_r$, is similar to the rolling friction of tires and can be estimated as:

$$\tau_r = C_{rr} R \|N\| \hat{b}_2 \tag{5}$$

where $C_{rr}$ is the rolling resistance coefficient, R is the radius of the cage, and N is the normal force:

$$N = Mg - u_f \cos(\theta) \hat{i}_3 \tag{6}$$

where M is the mass of the quadrotor, $m_B$, plus the mass of the cage, $m_C$, and $\theta$ is the pitch angle of the quadrotor with respect to $\hat{e}_1$.

2) Turning Resistance:

The turning resistance opposes the rotation of the robot along the yaw axis:

$$\tau_y = \omega \mu \|N\| \hat{i}_3 \quad (7)$$

where w is the width of the cage and μ is the wheel/terrain coefficient of friction. For planar motion, it was assumed that the robot can be modeled as a rolling disk. The velocity of the center point, O (see FIG. 15), expressed in I is given as:

$$^I v^O = \dot{x}\hat{i}_1 + \dot{y}\hat{i}_2 + \dot{z}\hat{i}_3 \quad (8)$$

The velocity of the center of mass of the quadrotor, B*, can also be calculated as:

$$^I v^{B*} = {^I v^O} - d\dot{\theta}\hat{b}_1 \quad (9)$$

where d is the distance between B* and O. The velocity of the contact point, P, can be obtained using the velocity of the center point, $^I v^O$.

$$^I v^P = {^I v^O} - R\dot{\Omega}\hat{e}_1 \quad (10)$$

where is the rotational velocity of the cage. The inertial observed velocity of point P, $^I v^P$, can be stated in I as:

$$^I v^P = (\dot{x} - R\dot{\Omega}\cos(\Psi))\hat{i}_1 + (\dot{y} - R\dot{\Omega}\sin(\Psi))\hat{i}_2 + \dot{z}\hat{i}_3 \quad (11)$$

Assuming pure rolling and no side slip, the velocity of the contact point should always be equal to zero. This gives the two following nonholonomic constraints:

$$\dot{x} - R\dot{\Omega}\cos(\Psi) = 0 \quad (12a)$$

$$\dot{y} - R\dot{\Omega}\sin(\Psi) = 0 \quad (12b)$$

The kinetic energy of the system during rolling can be estimated as:

$$K_T = \frac{1}{2}(m_C + m_B)(\dot{x}^2 + \dot{y}^2) - m_b Rd\dot{\Omega}\dot{\theta}\cos(\theta) + \\ \frac{1}{2}(I_2^B + m_B d^2)\dot{\theta}^2 + \frac{1}{2}I_2^C \dot{\Omega}^2 + \frac{1}{2}[I_3^C + I_1^B \sin^2(\theta) + I_3^B \cos^2(\theta)]\dot{\psi}^2 \quad (13)$$

where $m_C$ is the mass of the rolling cage; $I_1^C$ and $I_2^C$ are the moments of inertia of the cage about point O and along the $\hat{c}_1$ and $\hat{c}_2$ axes, respectively.

The potential energy of the robot is given as:

$$V_T = m_B \|g\| d[1 - \cos(\theta)] \quad (14)$$

The external forces and torques acting on the robot can be summarized as:

$$f_e = u_f \hat{b}_3 - u_d \hat{e}_1 \quad (15)$$

$$\tau_e = (u_\theta - \|\tau_r\|)\hat{e}_2 + (u_\psi \cos(\theta) - \|\tau_y\|)\hat{e}_3 \quad (16)$$

The air drag in the hybrid system is different from an aerial-only quadrotor because of the addition of the cage. Although the cage is designed such that the air can flow through it without much obstruction, the frontal area of the hybrid system was estimated to be equal to a solid cylinder of the same size as the cage. Experimental results, shown later, show that this is a good approximation.

Writing the Lagrange equation for the robot gives:

$$\frac{d}{dt}\left(\frac{\partial L}{\partial \dot{q}_k}\right) - \left(\frac{\partial L}{\partial q_k}\right) = Q_{q_k} + \lambda_1 a_{q_k} + \lambda_2 a_{q_k} \quad (17)$$

where L=K−V, $\lambda_1$ and $\lambda_2$ are the Lagrange multipliers, and $Q_{qk}$ is the external torque or force corresponding to each element. Solving this equation for the x and y coordinates yields:

$$M\ddot{x} - m_b d[\ddot{\theta}\cos(\theta)\sin(\Psi) - \dot{\theta}^2 \sin(\theta)\sin(\Psi) + \dot{\theta}\dot{\Psi}\cos(\theta)\cos(\Psi)] = u_f \sin(\theta)\cos(\Psi) + \lambda_1 \quad (18a)$$

$$M\ddot{y} - m_b d[\ddot{\theta}\cos(\theta)\cos(\Psi) - \dot{\theta}^2 \sin(\theta)\cos(\Psi) + \dot{\theta}\dot{\Psi}\cos(\theta)\sin(\Psi)] = u_f \sin(\theta)\sin(\Psi) + \lambda_2 \quad (18b)$$

Solving (17) for the rolling coordinate, Ω, yields:

$$I_2^C \ddot{\Omega} = -\|\tau_r\| - \lambda_1 R\cos(\Psi) - \lambda_2 R\sin(\Psi) \quad (19)$$

Replacing for $\lambda_1$ and $\lambda_2$ from (18) into (19), and deriving the Lagrange equation for Ψ and θ coordinates, yields:

$$\begin{cases} I_2^C \ddot{\Omega} + MR[\ddot{x}\cos(\psi) + \ddot{y}\sin(\psi)] + u_d R = u_f R\sin(\theta) + m_B Rd[\ddot{\theta}\cos(\theta) - \dot{\theta}\sin(\theta)] - \|\tau_r\| \\ [I_3^C + I_1^B \sin^2(\theta) + I_3^B \cos^2(\theta)]\ddot{\psi} + 2(I_2^B - I_1^B)\dot{\theta}\dot{\psi}\sin(\theta)\cos(\theta) = u_\psi \cos(\theta) - \|\tau_y\| \\ (I_2^B + m_B d^2)\ddot{\theta} + (I_3^B - I_1^B)\sin(\theta)\cos(\theta)\dot{\psi}^2 = u_\theta - m_B d[\|g\|\sin(\theta) - R\dot{\Omega}\cos(\theta)] \end{cases} \quad (20)$$

Equations (12) and (20) fully describe the dynamics of the robot in terrestrial mode and help with analyzing its performance in the following section.

II. Energy Analysis

The energy consumption of the hybrid robot in terrestrial mode was less than the aerial-only system during flight. This is analyzed in detail in this section. To begin this analysis, the performance of the propellers is examined by conducting static experiments.

A. Performance of the Propellers

The prototype included three bladed GWS propellers with a diameter of 127 mm and a 76 mm pitch. Three sets of experiments were performed to evaluate the propeller, and results are shown in FIG. 16 as curves that relate the power to the specific amounts of generated thrust. A single propeller tested separately is more efficient than four propellers mounted on the quadrotor working together. The overall air flow through the quadrotor affects the performance of each propeller and lowers the efficiency. The test was repeated after adding the cage to the quadrotor. Based on the results, addition of the cage causes a slight increase (less than 10%) in actuator's power consumption.

The performance of the propellers was modeled with a quadratic equation:

$$P = \alpha_1 f^2 + \alpha_2 f + \alpha_3 \quad (21)$$

where $\alpha_1$, $\alpha_2$ and $\alpha_3$ can be obtained through a basic curve fitting method. Obviously, these coefficients are different for an aerial-only system and the prototype.

B. Power Consumption at a Constant Speed

Figure 17:
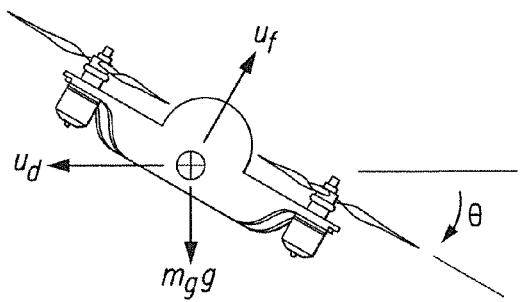
FIG. 17 illustrates forces acting on a quadrotor when flying at a constant speed

1) Aerial Mode:

To keep the robot airborne at a constant height and speed, the thrust should overcome the robot's weight and air resistance (see FIG. 17).

$$u_f = \sqrt{(m_B\|g\|)^2 + u_d^2} \qquad (22)$$

$$u_f \cos(\theta) = m_B\|g\| \qquad (23)$$

$$u_f \sin(\theta) = u_d = \frac{1}{2}\rho C_d A_f v^2 \qquad (24)$$

2) *Terrestrial Mode:*

To maintain a constant rolling speed on the ground, the rolling friction and air resistance must be overcome. It was assumed that the friction in the ball bearings can be neglected for this analysis. Assuming the case where the robot is rolling on the ground along the $\hat{e}_1$ axis (FIG. 18) with constant speed (i.e., $\ddot{x}=\ddot{y}=\ddot{\Omega}$), from (20):

$$u_f R \sin(\theta) - \|\tau_r\| - u_d R = 0 \qquad (25)$$

where $u_f$ is the amount of the force required to keep the system rolling at a constant speed. Replacing $u_d$ and $\tau_r$ from (3) and (5) and rearranging yields:

$$u_f = \frac{0.5\rho C_d A_f v^2 + M\|g\|C_{rr}}{\sin(\theta) + C_{rr}\cos(\theta)} \qquad (26)$$

This equation shows that the value of the required input force is a function of the velocity, v, pitch angle, θ, mass of the quadrotor and cage, M, and the surface type. Note that the frontal area term, $A_f$, in calculation of air resistance is different from that in aerial-only system due to the added area of the cage. The upper bound for the value of this area is where the cage is assumed to be solid and no air passes through it. This assumption was used in the analysis.

$u_\theta$ is the moment required to maintain a constant pitch angle, θ, and counteract the moment induced by the center of mass offset, which can be obtained from (20):

$$u_\theta = m_B d\|g\|\sin(\theta) \qquad (27)$$

Figure 18:
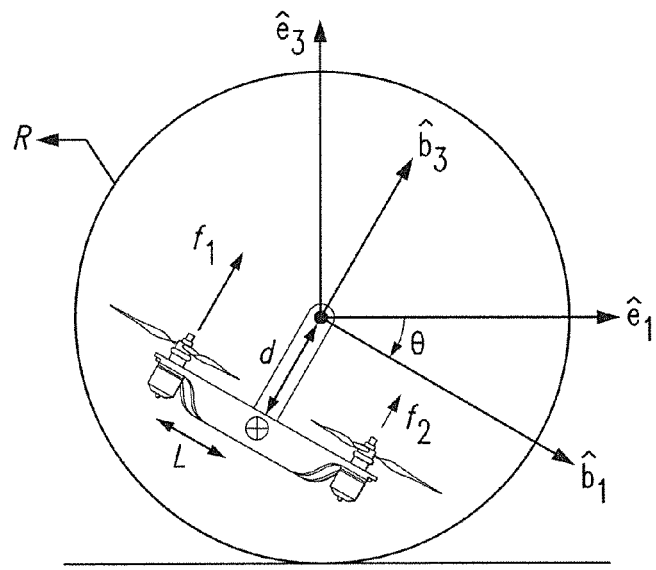
FIG. 18 illustrates notation used to describe the prototype geometry.

It was known that $u_\theta$ and $u_f$ are related based on the following equations.

$$u_f = f_1 + f_2 \qquad (28a)$$

$$u_\theta = (f_1 - f_2)L \qquad (28b)$$

where $f_1$, $f_2$ are the front and rear propeller thrusts as depicted in FIG. 18, required to have the system roll on the ground at a constant speed. Solving (28) for $f_1$ and $f_2$ and replacing from (26) and (27) gives:

$$f_1 = \frac{1}{2}\left[\frac{u_d + M\|g\|C_{rr}}{\sin(\theta) + C_{rr}\cos(\theta)} + m_B \frac{d}{L}\|g\|\sin(\theta)\right] \qquad (29a)$$

$$f_2 = \frac{1}{2}\left[\frac{u_d + M\|g\|C_{rr}}{\sin(\theta) + C_{rr}\cos(\theta)} - m_B \frac{d}{L}\|g\|\sin(\theta)\right]. \qquad (29b)$$

Figure 19:
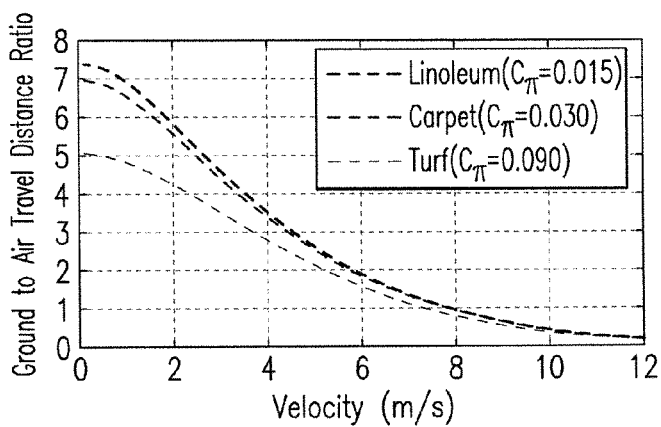
FIG. 19 illustrates analytically obtained ratio of robot's terrestrial range to aerial range as a function of speed.

Assuming the mass of the rolling cage to be 25% of that of the quadrotor, the distance the robot can roll on the ground is compared to an aerial-only quadrotor's flight time (see FIG. 19). This analysis shows that at low speeds, rolling is much more efficient compared to flying. For instance, on linoleum ($C_{rr}=0.015$) at 3 m/s the distance the robot can roll on the ground is theoretically six times longer than the flight range. This ratio decreases as surface friction increases, but even on turf with a respectively high rolling resistance ($C_{rr}=0.09$) rolling distance is more than four times greater than aerial range. These numbers has been validated through experiments and results are presented in next section.

C. *Optimal Inputs to Maximize the Range*

The maximum range of the prototype for each mode of travel is highly dependent to the robot's states. For the aerial mode, the pitch angle of the robot is the only input, while in terrestrial mode both the pitch angle and velocity of the robot affect the system performance and thus how far it can travel before the battery is depleted. Given a fixed amount of energy, E:

$$E = Pt \qquad (30)$$

where P is power and t is time. Therefore the robot's range, D, can be obtained using the following equation.

$$D = \frac{Ev}{P} \qquad (31)$$

1) *Aerial Mode:*

The velocity of the robot while flying at a constant height was a function of the pitch angle, which can be obtained dividing (24) by (23).

$$v = \sqrt{\frac{2m_B\|g\|\tan(\theta)}{\rho C_d A_f}} \qquad (32)$$

Replacing for v and $u_f$ from (32) and (23) into (31) and estimating power from (21) gives an equation for robot's range as a function of pitch angle. Using this equation, θ=30° is the optimal pitch angle that gives the maximum flight range at a constant speed and height.

2) *Terrestrial Mode:*

Figure 20:
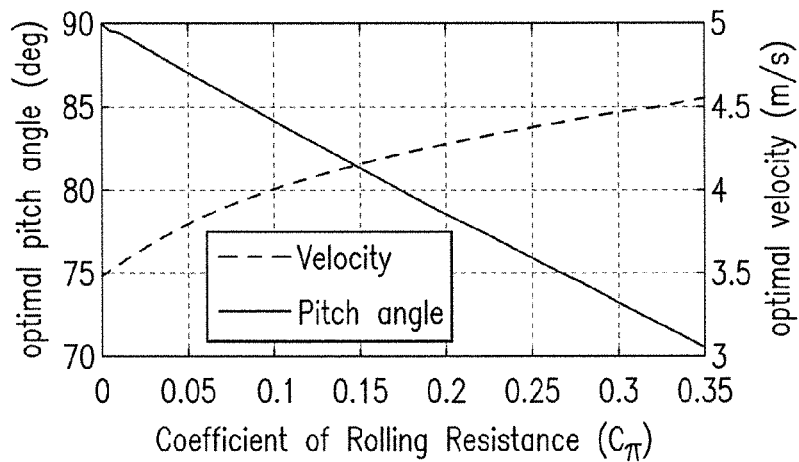
FIG. 20 shows the optimal pitch angle and velocity that maximizes the robot's range as a function of terrain type.

During ground locomotion changes in both velocity and pitch angle affected the prototype's energy consumption.

$$D_T = \frac{Ev}{a_1(f_1^2 + f_2^2) + a_2(f_1 + f_2) + 2a_3} \qquad (33)$$

where $D_T$ represents terrestrial mode range and $f_1$ and $f_2$ can be replaced from (29). Nonlinear programming was used to obtain the optimal terrestrial range for different terrain types. FIG. 20 shows the optimal pitch angle and velocity of the robot as a function of the coefficient of rolling resistance. The results suggest that as the rolling resistance increases the pitch angle should decrease such that the vertical component of the thrust becomes nonzero. This component helps reduce the normal force on the ground and consequently compensates for a portion of the friction force. Also, the analysis indicates that optimal speed should increase as the terrain gets rougher.

III. Experiments

The energy efficiency and operation time and range of the two working modes were investigated by operating the robot at constant speeds in both aerial and terrestrial modes.

A. *Aerial Mode*

The quadrotor was tested inside a wind tunnel to measure the power consumption during flight as a function of pitch angle. The Andrew Fejer Unsteady Flow Wind Tunnel, used in this experiment, is a closed circuit, low-speed facility, driven by an axial-vane fan powered by a 40 HP synchronous motor. The motor is made by Baldor Electric Co. and is an EM2540T model. The wind-tunnel test section is 0.61 m×0.61 m in cross section and 3.1 m in length. Flow velocities up to 40 m/s can be reached by adjusting an H2 vector drive controller, which controls the fan rotational speed. Screens, honeycombs, and a contraction region upstream of the test section yield a turbulence level of 0.3% at the maximum velocity.

Figure 23:
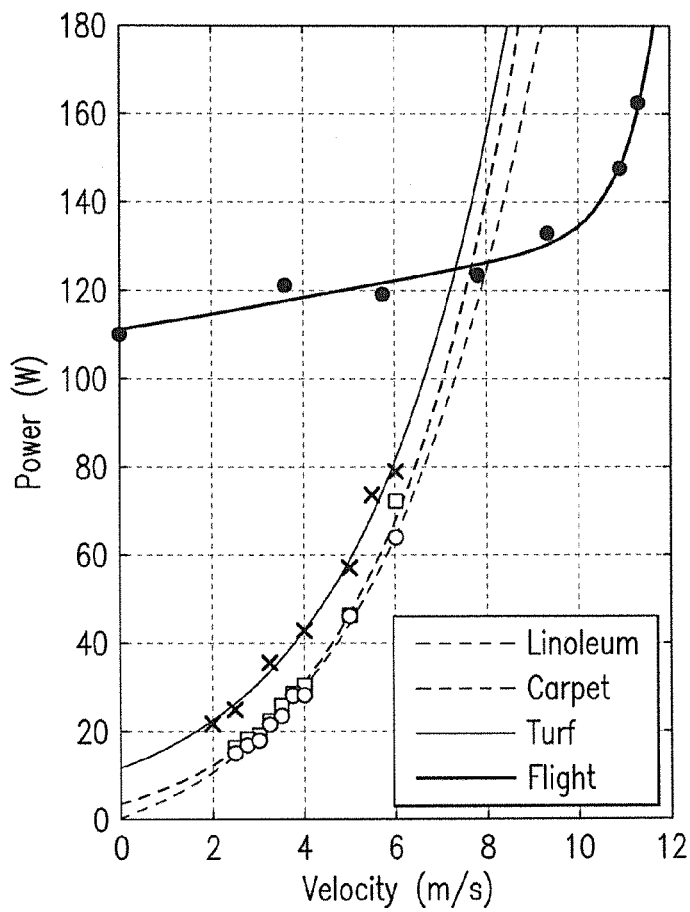
FIG. 23 illustrates power consumption of the robot during flight and on the ground. Curves fitted based on the experimental data.

The quadrotor was mounted on top of a 6-DOF force-torque sensor. Force measurements are taken at 1000 Hz using a National Instruments DAQ card and Labview. The values of thrust and wind speed were adjusted such that when the vertical force component equaled the weight of the quadrotor, the air drag force equaled the horizontal component of the propeller's force. At this state, the power was directly measured from the power source and the wind speed was representative of the quadrotor's flight speed. The measurements corresponding to six different pitch angles of 5, 10, 15, 20, 25, and 30 degrees are depicted in FIG. 23.

Hovering required about 110 W of power. The quadrotor could not produce enough thrust to overcome its weight at angles greater than 30°. At a pitch angle of 30°, which corresponded to a horizontal speed of 11.30 m/s, the quadrotor consumed about 160 W. The results show that the maximum range can be obtained at a pitch angle of 24° which is less than the theoretically estimated optimal angle of 30°. This also means the quadrotor used in prototype can fly a maximum horizontal distance of 3.6 km with a fully charged battery.

B. Terrestrial Mode

For terrestrial mode, three sets of experiments were performed on three different terrain types: linoleum, carpet, and turf. The rolling resistances of the chosen surfaces were measured by dragging the prototype on the surface with a rope coupled to a load cell. Three different pitch angles of 80°, 85°, and 90° were tested. The velocity range between the robot's minimum possible speed on a particular surface (2.5 m/s for linoleum and carpet and 2 m/s on turf) was up to 6 m/s. The speed of prototype was measured using a rotary encoder. Power consumption was measured directly from the battery output using voltage and current sensors.

Figure 21:
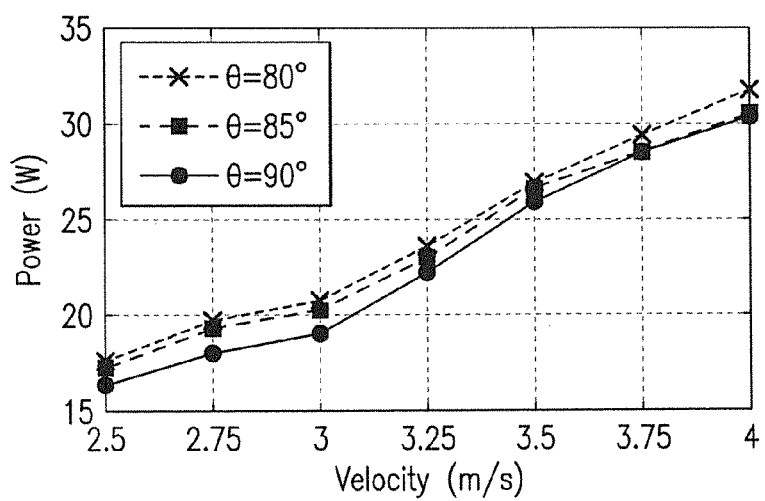
FIG. 21 illustrates experimental data of the power consumed while rolling on carpet ($C_{rr}=0.03$) at different speeds for three constant pitch angles. The robot consumes the least power while rolling at a pitch angle of 90°.
Figure 22:
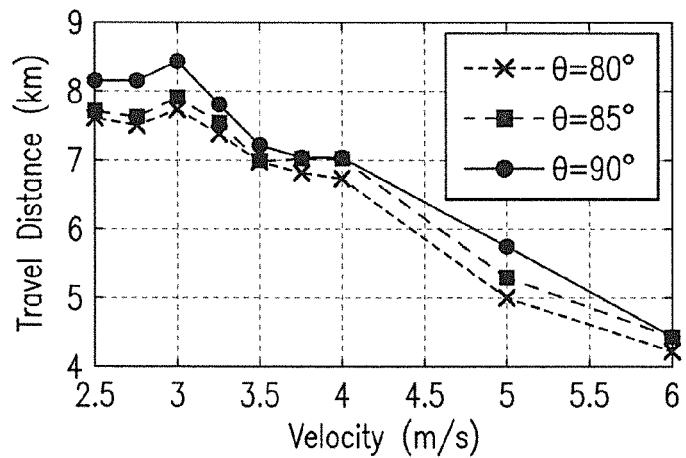
FIG. 22 illustrates the distance the robot can roll on carpet ($C_{rr}=0.03$) with a fully charged battery (1350 mAh) at different speeds and three constant pitch angles. The maximum range of 8.5 km is achieved at a speed of 3 m/s and pitch angle of 90°

FIG. 21 shows the results for rolling on carpet. Note that at a pitch angle of 90°, the robot consumed the least amount of power among the three tests at all tested speeds. The robot's range as a function of speed and pitch angle is also depicted in FIG. 22. The robot's maximum range was 8.5 km ($C_{rr}$=0.03), which was achieved when the robot traveled at 3 m/s and the pitch angle was maintained at 90°. This was about 2.4 times greater than the maximum aerial range of the quadrotor.

The performance of each propeller of the system was evaluated above. The results depicted in FIG. 16 show that the efficiency of the propellers decrease when mounted on the robot. This indicates an improvement in the design can be made by isolating the air flow through each propeller from other ones using a separating structure or by increasing the space between the propellers. The addition of the cage to the quadrotor again decreases the efficiency. Therefore design of cage structure can also be adjusted to minimize the power losses.

Although the cage structure was relatively open, the drag coefficient of the robot was assumed to be equal to that of a solid cylinder. The results show that this assumption is not far from reality, and as the cage spins it behaves more like a solid cylinder. This indicates that the design of the cage can help lower its drag coefficient and improve the efficiency of the ground mode, especially at high speeds.

Figure 24:
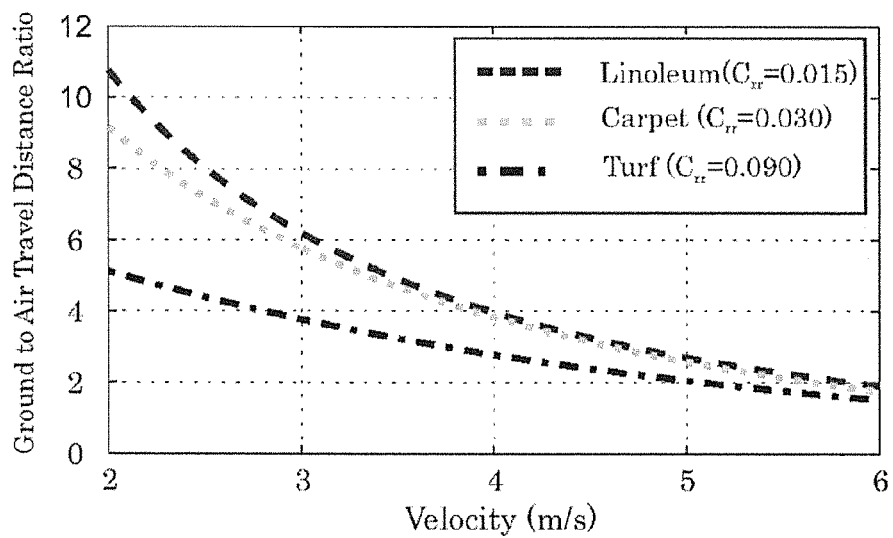
FIG. 24 illustrates experimentally obtained ratio of robot's terrestrial range to aerial range as a function of speeds. The ratio decreases as velocity increases.

The experimental results summarized in Table II indicate that it is much more efficient to roll on the ground instead of flying, especially at low speeds. For instance at 2 m/s the rolling distance on linoleum is about 11 times greater than the flight range (See FIG. 24). This ratio decreased as the speed increases. The robot was not driven at speeds higher than 6 m/s, but extrapolation of available experimental data (See FIG. 23) shows that beyond 8 m/s rolling on linoleum should be less efficient than flying.

TABLE II

SUMMARY OF RESULTS FROM EXPERIMENTS

| Terrain | $C_{rr}$ | Optimal Speed (m/s) | Optimal Pitch Angle | Max. Range (km) | Max. Time (min) |
|---|---|---|---|---|---|
| Flight | — | 10.7 | 24° | 3.6 | 5.5 |
| Linoleum | 0.015 | 3 | 90° | 9.0 | 50 |
| Carpet | 0.030 | 3 | 90° | 8.5 | 47 |
| Turf | 0.090 | 4 | 85° | 5.2 | 22 |

Comparing the optimal values of pitch angle and velocity from Table II with what was theoretically estimated in FIG. 20 shows that the values are very close, especially for the turf experiments. The operation times is about 10 times greater when rolling on the ground compared to the flight mode and the robot's range on linoleum is 2.5 times greater than the flight range.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A terrestrial and aerial vehicle, comprising a flying device and a non-actuated rolling cage connected to the flying device by at least one revolute joint, the rolling cage comprising two opposing hubs and a plurality of rails each connected at a first end to one of the two opposing hubs and at a second end to an other of the two opposing hubs, wherein the rolling cage rolls against a terrestrial surface and rolls about the flying device.

2. The vehicle of claim 1, wherein the rolling cage extends around at least a portion of the flying device.

3. The vehicle of claim 1, wherein the revolute joint comprises a shaft and a bearing.

4. The vehicle of claim 3, wherein the flying device comprises four rotor arms each including an actuated rotor, wherein the shaft extends outward from the flying device between two of the four rotor arms.

5. The vehicle of claim 1, wherein the rolling cage surrounds or encloses at least a portion of the flying device.

6. The vehicle of claim 1, wherein the flying device comprises a rotor disposed within the rolling cage.

7. The vehicle of claim 6, wherein the rotor propels both aerial and terrestrial surface locomotion.

8. The vehicle of claim 1, wherein the flying device comprises a rotor powered by an actuator motor, and wherein the rolling cage is a non-powered rolling cage.

9. The vehicle of claim 1, further comprising a controller adapted to receive a wireless control signal.

10. The vehicle of claim 1, further comprising a plurality of rotors enclosed by the rolling cage.

11. The vehicle of claim 1, further comprising a surveillance camera mounted on the flying device.

12. The vehicle of claim 1, wherein the rolling cage includes a first circular cross rail at a first hub of the two opposing hubs and a second circular cross rail at the second hub of the two opposing hubs, and each of the plurality of rails extends between and connects the first circular cross rail and the second circular cross rail.

13. A terrestrial and aerial vehicle, comprising:
a flying device with a first side and a second side opposite the first side and including a plurality of rotors; and
a non-actuated rolling cage connected to the flying device by a first revolute joint and a second resolute joint, and at least partially enclosing or surrounding the flying device, the rolling cage including: a first hub connected to the first side of the flying device by the first resolute joint, a second hub connected to the second side of the flying device by the second resolute joint, and a plurality of rails each connected at a first end to the first hub and at a second end to the second hub, wherein the plurality of rotors is disposed within the rolling cage and the rolling cage rolls freely about the flying device.

14. The vehicle of claim 13, wherein each of the first and second revolute joints comprises a shaft end connected to a bearing.

15. The vehicle of claim 13, wherein the rotor propels both aerial and terrestrial surface locomotion, wherein the rolling cage rolls about the flying device upon movement of the flying device and contact with a terrestrial surface.

16. The vehicle of claim 13, wherein the rolling cage rotates about a shaft connected to the flying device, the shaft extends perpendicular to an axis of each of the at least one rotor, and the shaft is connected to the flying device or the rolling cage by a bearing.

17. A terrestrial and aerial vehicle, comprising:
a rotorcraft including four actuated rotors;
a non-actuated rolling cage connected to and enclosing the rotorcraft, wherein the rolling cage rolls about the rotorcraft upon movement of the rotorcraft and contact with a terrestrial surface, the rolling cage including: two opposing hubs each connected to the rotorcraft by a shaft and a revolute joint, and a plurality of rails each connected at a first end to one of the two opposing hubs and at a second end to an other of the two opposing hubs, wherein each of the plurality of rails includes at least a portion that is parallel to the shaft.

18. The vehicle of claim 17, wherein each of the two opposing hubs comprises a bearing connecting the shaft to the rolling cage.

19. The vehicle of claim 17, further comprising four rotor arms each including one of the four actuated rotors, wherein the shaft extends outward from the rotorcraft between two of the four rotor aims.

20. The vehicle of claim 17, wherein the rolling cage includes a first circular cross rail at a first hub of the two opposing hubs and a second circular cross rail at the second hub of the two opposing hubs, and the portion parallel to the shaft of each of the plurality of rails extends between and connects the first circular cross rail and the second circular cross rail.

* * * * *